United States Patent Office 2,755,261
Patented July 17, 1956

2,755,261

STABILIZED ORGANOSILICON COMPOSITIONS

Harold A. Clark, Midland, Mich., assignor to Dow Corning Corporation, Midland, Mich., a corporation of Michigan No Drawing. Application May 4, 1953,
Serial No. 352,967

3 Claims. (Cl. 260—29.1)

This invention relates to stable solutions of organosilicon resins.

One of the difficulties which has been encountered in commercial use of organosilicon resins is the change of viscosity of catalyzed resin solutions upon standing. This change in viscosity is a problem in those uses which require that the viscosity remain within a fairly narrow range over long periods of time. For example, in the coating of electrical apparatus with silicone varnishes, a catalyzed varnish solution is placed in a tank and the various electrical parts are dipped as required. As the varnish solution becomes depleted, more is added to maintain the required volume. In such cases, the varnish solution may stand for weeks before it is completely consumed.

During this time, it is necessary that the viscosity of the solution remain reasonably constant. If the viscosity becomes too low, an insufficient amount of resin will adhere to the apparatus when it is removed from the dipping bath. If the resin gels, it becomes entirely useless. A solution which maintains an essentially constant viscosity is also needed in other coating applications.

Another problem which has long plagued the silicone industry, has been the change in viscosity of catalyzed silicone resin solutions between the time of manufacture and the time that the solutions are employed. Thus, for example, a manufacturer may make a resin solution to certain viscosity specifications and then find that by the time the material has reached the user the viscosity has changed either up or down so that it is no longer within the specified range.

It is the object of this invention to provide an economical and feasible means of stabilizing the viscosity of catalyst-containing polysiloxane resin solutions. Another object is to obviate the difficulties arising from change in viscosity of siloxane resin solutions during storage or use.

This invention relates to a composition of matter comprising an organopolysiloxane resin wherein the organic groups are monovalent hydrocarbon radicals or halogenated derivatives thereof and from .5 to 5 per cent by weight based on the weight of the resin of a monohydroxy aliphatic alcohol of at least four carbon atoms or an aryl hydrocarbon substituted monohydroxy aliphatic alcohol.

The applicant has found that solutions of catalyzed organopolysiloxane resins are stabilized by adding thereto from .5 to 5 per cent by weight (based on the weight of the siloxane resin) of any of the above defined alcohols. The term "monohydroxy aliphatic alcohol" as employed herein includes both straight-chain and branched-chain alcohols such as butanol, tertiary amyl alcohol, beta-allylethyl alcohol and octadecyl alcohol. Also operative in this invention are aryl hydrocarbon substituted monohydroxy aliphatic alcohols such as benzyl alcohol, ethylphenyl alcohol and cinnamic alcohol.

The alcohols must be employed in amount from .5 to 5 per cent by weight if the benefits of this invention are to be realized. When the amount is below .5 per cent there is no effect on the viscosity change of the resin solution. When the amount of alcohol is above 5 per cent by weight, viscosity changes are greater than if no alcohol is used.

Any monovalent hydrocarbon substituted polysiloxane resin is within the scope of this invention. Also halogenated monovalent hydrocarbon substituted polysiloxane resins are included within its scope. As is well known, organopolysiloxane resins have from 1 to 1.8 organic radicals per silicon atom. Specific examples of organic radicals which can be substituted on the siloxane are methyl, ethyl, butyl, octadecyl, vinyl, allyl, hexenyl, cyclohexyl, cyclopentyl, phenyl, xenyl, naphthyl, tolyl, benzyl, chlorophenyl, trifluoro tolyl, hexafluoroxylyl and bromoxenyl.

The solvents which may be employed in the solutions of this invention are hydrocarbon solvents, halogenated hydrocarbon solvents or ethers. Specific examples of such solvents are toluene, xylene, petroleum spirits, methylene chloride and diethyl ether.

The catalysts which are employed with the composition of this invention may be any of the conventional organosiloxane resin setting catalysts. Specific examples of such catalysts are metal salts of carboxylic acids such as zinc-2-ethylhexoate, lead-2-ethylhexoate, cobalt naphthenates and lead naphthenates and quaternary ammonium compounds such as trimethylbenzyl ammonium butoxide and trimethylbetahydroxyethyl ammonium 2-ethylhexoate.

The compositions of this invention are particularly useful as dipping varnishes and for other applications which require the maintenance of relatively constant viscosity in the coating solution.

The following examples are illustrative only and should not be construed as limiting the invention which is properly delineated in the appended claims.

EXAMPLE 1

The siloxane solution employed in this example was a 50 per cent by weight xylene solution of a polysiloxane resin having the composition 35 mol per cent phenylmethylsiloxane, 10 mol per cent dimethylsiloxane, 30 mol per cent monomethylsiloxane and 25 mol per cent monophenylsiloxane. The solution contained $\frac{1}{10}$ per cent by weight zinc metal (added as the octoate) based upon the weight of the polysiloxane resin. The viscosity of this solution at 25° C. was 200 cps.

The various alcohols shown in the table below were added to this solution in the amounts indicated and the viscosity of the resulting solutions were checked periodically over a period of 380 days. The results are as shown in the table.

Table I

| Alcohol added | Amount in percent by weight | Viscosity in cps. at 25° C. | | | | |
|---|---|---|---|---|---|---|
| | | Initial | 8 days | 30 days | 90 days | 380 days |
| None | | 200 | 218 | 200 | 218 | gelled |
| n-butanol | 1 | 150 | 150 | 120 | | 225 |
| 2-ethylhexanol | 1 | 155 | 155 | 130 | 140 | 170 |
| 2-ethylhexanol | 5 | 155 | 150 | 115 | 125 | 215 |
| Benzyl alcohol | 1 | 160 | 165 | 140 | 150 | 185 |

EXAMPLE 2

Results equivalent to those shown in Example 1 are obtained when 1 per cent by weight 2-ethylhexanol is added to a 50 per cent xylene solution of an organopolysiloxane resin having the composition 10 mol per cent trifluorotolylmethylsiloxane, 25 mol per cent chlorophenylsiloxane, 25 mol per cent phenylethylsiloxane, 5 mol per cent monostearylsiloxane, 20 mol per cent monomethylsiloxane and 15 mol per cent dimethylsiloxane, said solution containing $\frac{1}{10}$ per cent by weight zinc metal (added as the octoate) based upon the weight of the polysiloxane resin.

That which is claimed is:

1. A composition of matter comprising a solution of (a) an organopolysiloxane resin in which the organic radicals are selected from the group consisting of monovalent hydrocarbon radicals and halogenated monovalent hydrocarbon radicals, (b) from .5 to 5 per cent by weight based on the weight of the resin (a) of an alcohol selected from the group consisting of monohydroxy aliphatic alcohols of at least four carbon atoms and aryl hydrocarbon substituted monohydroxy aliphatic alcohols, (c) a curing catalyst and (d) an organic solvent.

2. A composition in accordance with claim 1 wherein the resin is a methylphenylsiloxane resin.

3. A composition in accordance with claim 1 wherein the alcohol is 2-ethylhexanol.

References Cited in the file of this patent
UNITED STATES PATENTS 2,383,827  Sprung _____ Aug. 28, 1945